United States Patent Office 2,949,441
Patented Aug. 16, 1960

2,949,441

PROCESS FOR CURING MATERIALS POSSESSING INTERNAL EPOXY GROUPS

Herbert A. Newey, Lafayette, Calif., assignor to Shell Oil Company, New York, N.Y., a corporation of Delaware No Drawing. Filed Nov. 17, 1955, Ser. No. 547,527

14 Claims. (Cl. 260—78.4)

This invention relates to a process for curing and resinifying materials possessing a plurality of epoxy groups. More particularly, the invention relates to a process for curing materials possessing a plurality of epoxy groups in an internal position using a special curing system, and to the resulting cured products.

Specifically, the invention provides a new process for curing and resinifying material possessing a plurality of internal epoxy groups, and preferably epoxidized glycerides, which comprises mixing and reacting the said material with a carboxylic acid anhydride in the presence of a compound selected from the group consisting of amines, their salts and quaternary ammonium salts. The invention further provides cured products obtained by the above-described process which are characterized by their excellent hardness and flexibility.

It is known that materials having epoxy groups in a terminal position, i.e., materials possessing

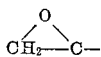

groups, such as the commercially available glycidyl polyethers, can be cured to form attractive products by reacting with alkaline materials, such as polyamines. Materials having internal epoxy groups, i.e., materials possessing

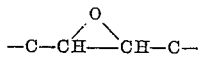

groups, such as epoxidized soybean oil, are potentially cheaper materials than the compounds having the terminal epoxy groups and would be highly desirable replacements therefor for many applications. It has been found, however, that these materials are extremely difficult to cure due to the effect of having substituents on both carbon atoms in the epoxy group, and at best they form only very soft products which have no practical utility.

It is an object of the invention, therefore, to provide a new process for curing materials having internal epoxy groups. It is a further object to provide a new process for curing polyepoxides having internal epoxy groups using a special curing system. It is a further object to provide a new process for curing materials having internal epoxy groups which yields very hard products. It is a further object to provide a new process for curing epoxidized oils to form hard flexible castings in a very short period of time. It is a further object to provide cured epoxidized oils which are very hard and durable and have good flexibility. These and other objects of the invention will be apparent from the following detailed description thereof.

It has now been discovered that these and other objects are accomplished by the process of the invention comprising mixing and reacting the material having a plurality of internal epoxy groups with carboxylic acid anhydride in the presence of a compound selected from the group consisting of amines, their salts and quaternary ammonium salts. It has been found this special curing system comprising the anhydrides in combination with the above activators have an unexpected action on the internal epoxy groups and cause a very rapid cure to form hard flexible castings. As shown in the working examples at the end of the specification, this was quite unexpected as treating of these materials with curing agents, such as polyamines, formed only very soft products.

The materials to be cured by the process of the invention comprising those materials having a plurality of internal epoxy groups, i.e., a plurality of

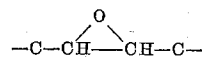

groups. These groups may be in an open or closed chain portion of the molecule. The molecule is preferably aliphatic and free of substituents other than carbon, hydrogen, oxygen and chlorine.

For clarity, many of the materials will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the material with an excess of pyridinium chloride dissolved in pyridine at the boiling point for 20 minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

If the epoxy-containing materials are single monomeric compounds having all of their epoxide groups intact, their epoxy equivalency will be whole integers, such as 2, 3, 4 and 5. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric materials and others may, for example, have epoxy equivalent values, such as 1.5, 1.8, 2.5 and the like.

The epoxy-containing materials referred to above may be exemplified by the epoxidized esters of the polyethylenically unsaturated monocarboxylic acids, such as epoxidized linseed, soyabean, perilla oiticia, tung, walnut and dehydrated castor oil, methyl linoleate, butyl linolenate, ethyl 9,12-octadecadienoate, butyl 9,12,15-octadecatrienoate, ethyl elaeostearate, octyl 9,12-octadecadienoate, methyl elaostearate, monoglycerides of tung oil fatty acids, monoglycerides of soyabean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di-(5,6-epoxypentadecyl) tertarate, di(4,5-epoxytetradecyl) maleate, di(2,3-epoxybutyl) azelate, di(2,3-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxyhexanoate, 3,4-epoxyhexyl. 3,4-epoxypentanoate, 3,4-epoxycyclohexyl, 3,4-cyclohexanoate, 3,4-epoxycyclohexyl 4,5-epoxyoctanoate, and the like.

Still another group of the epoxy-containing materials include epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl-8,9,12,13-diepoxyeicosanedioate, dihexyl 6,7,10,11-diepoxyhexadecanedioate, didecyl 9 - epoxyethyl - 10,11 - epoxyoctadecenedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol the polyester obtained by reacting diethylene glycol with 2-cyclohexene-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Particularly preferred materials to be used according to the process of the invention comprise the epoxidized esters of polyethylenically unsaturated monocarboxylic acids containing not more than 22 carbon atoms, the epoxidized esters of polyethylenically unsaturated polycarboxylic acids containing not more than 25 carbon atoms, and the epoxidized esters of ethylenically unsaturated monohydric alcohols and ethylenically unsaturated carboxylic acids containing not more than 22 carbon atoms.

The above-described epoxy-containing materials are preferably obtained by epoxidizing the corresponding unsaturated compounds. Thus, the compounds such as dimethyl 8,9,12,13-diepoxy-eicosanedioate may be obtained by epoxidizing dimethyl 8,9,12,13-eicosadienedioate. The epoxidization may be accomplished by merely reacting the unsaturated compound with an epoxidizing agent. Organic peracids, such as performic, peracetic, perbenzoic acid, monoperphthalic acid and the like, are preferred agents for this reaction.

The amount of epoxidizing agent employed will vary over a considerable range depending upon the type of product desired. In general, one should employ at least one mole of the oxidizing agent, such as perbenzoic acid, for every ethylenic group to be epoxidized. Thus to produce epoxidized dicrotyl adipate from dicrotyl adipate, one should react the unsaturated ester with at least two moles of perbenzoic acid. In some cases, it is rather difficult to effect epoxidation of all of the ethylenic groups and if a completely epoxidized product is required, additional epoxidizing agent and/or longer reaction period may be required.

The temperature employed during the epoxation may vary over a considerable range depending upon the type of reactants and epoxidizing agents selected. It is generally desirable to maintain the temperature between —20° C. to 100° C. Preferred temperatures range from about —10° C. to room temperature, e.g., about 20° C. Atmospheric, superatmospheric, or subatmospheric pressures may be employed as desired.

The epoxidized product obtained by this method may be recovered from the reaction mixture by any convenient means known to the art, such as distillation, extraction, fractional precipitation and the like.

The acid anhydrides used as the curing agent in the process of the invention may be any anhydride which is derived from a polycarboxylic acid and possesses at least one anhydride group, i.e., a

The carboxylic acids used in the formation of the anhydrides may be saturated, unsaturated, aliphatic, cycloaliphatic, aromatic or heterocyclic. Examples of these anhydrides include, among others, phthalic anhydride, isophthalic anhydride, di-, tetra- and hexahydrophthalic anhydride, 3,4,5,6,7,7-hexachloro-3,6-endomethylene 1,2-3,6-tetrahydrophthalic anhydride (chlorendic anhydride), succinic anhydride, maleic anhydride, chlorosuccinic anhydride, monochloromaleic anhydride, 6-ethyl-, 4-cyclohexadiene, 1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhyride, 3-methoxy-1,2,3,6-tetrahydrophthalic acid anhydride, 3-butoxy-1,2,3,6-tetrahydrophthalic anhydride, pyromellitic anhydride, di-, tetra- and hexahydropyromellitic anhydride, polyadipic acid anhydride, polysebacic acid anhydride, the maleic anhydride adduct of unsaturated oils, such as linseed oil, and the like and mixtures thereof.

Preferred anhydrides to be employed in the process comprise the aliphatic, cycloaliphatic and aromatic mono- and dianhydrides (i.e., those possessing two of the above-noted anhydride groups such as pyromellitic anhydride), and the chlorinated derivatives of the aforedescribed mono-di-anhydrides. Especially preferred are the normally liquid or low melting anhydrides, such as hexahydrophthalic anhydride.

The activators for the anhydrides may be a member of the group consisting of amines, their salts and quaternary ammonium salts. Preferred amines are the tertiary amines, such as, for example, p,p'-bis(dimethylaminophenyl) methane, pyridine, dimethyl aniline, benzyldimethyl amine, dimethylethanolamine, methyldiethanol amine, morpholine, dimethylaminopropylamine, dibutylaminopropylamine, stearyldimethylamine, tri-n-butyl amine, N,N-dibutyl butylamine, tri-n-hexylamine, ethyl di-n-propylamine, phenylene diamine, diethylene triamine and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof.

Preferred activators to be used are the hydrocarbon tertiary amines, and more preferably the mono- and diamines wherein the amine hydrogen have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkyl amines, diaminoalkanes, dialkylene triamines, phenylene diamines and di(aminoaryl) alkanes. Preferred amines salts are the hydrochloride, sulfate and acetate of the above-described preferred amines. The preferred quaternary salts are those of the formula

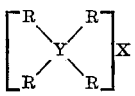

wherein Y is nitrogen, R is an alkyl, aryl or arylalkyl radical, preferably containing no more than 12 carbon atoms and X is chlorine.

According to the process of the invention, the material containing the internal epoxy groups is cured by admixing and reacting the material with above-described anhydrides and activator. The amount of the anhydride to be used in the process will vary over a wide range. Good cures are obtained by reacting the polyepoxide with at least .8 equivalent of the anhydride. As used herein in relation to the amount of anhydride and polyepoxide, the expression "equivalent" amount refers to that amount of anhydride needed to furnish one anhydride group for every epoxy group in the polyepoxide to be involved in the cure. To obtain the best results, the anhydride should be employed in about at least a chemical equivalent amount, and more preferably in equivalent ratio of 1:1 to 1.5:1.

The activator is needed only in very small amounts. Excellent results are obtained when the activator is utilized in amounts varying from 0.1% to 4% by weight of the resin, i.e., resin containing both polyepoxide and anhydride, and more preferably in amounts varying from 0.1% to 2% by weight of the resin.

The anhydride and activators may be combined together before they are added to the polyepoxide or they may be added separately.

In executing the process of the invention, it is desirable to have the polyepoxide in a mobile liquid condition when the anhydrides and activator are added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride amine mixture by evaporation before or during the curing, such as ketones like acetone, methyl ethyl ketone, methyl isobutyl ketone, isophorone, etc., esters such as ethyl acetate, butyl acetate, Cellosolve acetate (ethylene glycol monoacetate) methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc., and/or alcohols, such as ethyl, isopropyl or n-butyl alcohol. Solvents which remain in the cured composition may also be used, such as diethyl phthalate, dibutyl phthalate, or liquid monoepoxide compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide, such as a normally liquid glycidyl polyether of a polyhydric alcohol. Various other ingredients may be mixed with the polyepoxide composition including pigments, fillers, dyes, plasticizers, resins, and the like.

The cure may be effected over a wide range of temperatures. The cure may be accomplished, for example, by merely mixing the anhydride and activator with the polyepoxide as indicated above and then letting the mixture stand at room temperature. In some applications, it may be desirable to effect a more rapid cure and this may be accomplished by raising the temperature. Excellent rates of cure are obtained at temperatures from 50° C. to 110° C. and these are preferred from many applications where heating is permissible. Temperatures much above 200° C. are generally not desirable but may be employed if necessary.

The curing agent-polyepoxide systems described above may be utilized for a great variety of important applications. They may be used, for example, in the preparation of coating compositions such as enamels and paints. In these applications, it is generally desirable to combine the polyepoxide with the anhydride and activator and desired solvents or other film-forming materials, and then apply this mixture to the surface to be coated. The coatings may then be allowed to set at room temperature or heat may be applied.

The systems described above are also very useful in the preparation of pottings and castings. They are particularly suitable for preparing very large castings as can be cured at low temperatures without liberation of large amounts of heat and this gives a more even cure which results in much stronger and more durable products. In this application, the mixture of polyepoxide, anhydride and activator alone or with suitable diluents is added to the desired mold or casting and then allowed to set at room temperature. Heat may be applied in some cases to hasten cure.

The above-described systems are also useful in the preparation of laminates. In this application, the sheets of fibrous materials are first impregnated with the mixture of polyepoxide, anhydride and activator. This is conveniently accomplished by dissolving the anhydride and activator in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, canvas, and the like. It is usually preferred to utilize woven glass cloth that has been given prior treatment with well known finishing or sizing agents, therefor, such as chrome methacrylate or vinyl trichlorosilane.

In the above applications, the resulting cured products are characterized by their excellent hardness, durability and good water resistance.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

*Example I*

This example illustrates the unexpected results obtained by treating epoxidized soyabean oil with an acid anhydride in the presence of an amine as compared to the results obtained with known curing agents.

(a) 100 parts of epoxidized soyabean oil described above was mixed with the materials shown in the table below in the indicated amount. The mixtures were then heated at 160° C. for one half hour. As indicated in the table, in most cases no noticeable change occurred and in the other cases the mixture set up only to a very soft gel.

| Curing Agent | Phr. | Cure Obtained |
| --- | --- | --- |
| Diethylene triamine | 10 | None. |
| 2,4,6-tri(dimethylaminoethyl) phenol | 10 | Do. |
| Diethylaminopropylamine | 10 | Do. |
| BF$_3$-triethanolamine | 1 | Do. |
| Citric Acid | 20 | Formed soft gel. |
| Hydrogenated dimer acids | 20 | None. |

(b) 100 parts of epoxidized soyabean oil described above was then mixed with an equivalent amount of chlorendic anhydride (46 parts) and 1 part of p,p'-bis(dimethylaminophenyl) methane and the mixture placed in a metal cup and heated to 100° C. for four hours. The resulting product was a hard strong casting which could be bounced on the floor without breaking.

*Example II*

This example illustrates the unexpected improvement in cure obtained by treating epoxidized soyabean oil with phthalic anhydride in the presence of pyridine.

(a) 100 parts of epoxidized soyabean oil having the properties described in Example I was mixed with 56 parts of phthalic anhydride and 1 part of pyridine and the mixture heated for four hours at 125° C.; the resulting product was a very hard product which could be bounced off the floor without breaking.

Related results are obtained by replacing the pyridine in the above process with equal amount of benzyldimethylamine or equal amount of p,p'-bis(dimethylaminophenyl) methane.

(b) The above experiments were repeated in the absence of the amines. In both cases, the mixture remained fluid during the four hours of heating at 125° C.

*Example III*

Example I (b) was repeated with the exception that the p,p'-bis(dimethylaminophenyl) methane was replaced by an equal amount of pyridine. The product obtained in this case was also a hard strong casting which could be bounced on the floor without breaking.

*Example IV*

Example I (b) was repeated with the exception that the chlorendic anhydride was replaced by an equivalent amount of chloromaleic anhydride. The product obtained in this case was also a hard strong casting which could be bounced on the floor without breaking.

*Example V*

Example I(b) was repeated with the exception that the chlorendic anhydride was replaced by an equivalent amount of maleic anhydride. The product obtained in this case was also a hard strong casting.

*Example VI*

This example illustrates the unexpected improvement in cure obtained by treating epoxidized soybean oil with a mixture of chlorendic anhydride, chlorophthalic anhydride and hexahydrophthalic anhydride in the presence of benzyltrimethylammonium chloride.

100 parts of epoxidized soybean oil having the properties described in Example I was mixed with 99 parts of a mixture of anhydrides made up of 33 parts chlorendic anhydride, 33 parts of chlorophthalic anhydride, and 33 parts of hexahydrophthalic anhydride, and 1 part of benzyltrimethylammonium chloride was added thereto. This mixture was heated for four hours at 100° C. The resulting product was a hard strong casting.

*Example VII*

This example illustrates the unexpected improvement in cure obtained by treating epoxidized soybean oil with a mixture of chlorendic anhydride, chlorophthalic anhydride and hexahydrophthalic anhydride in the presence of benzyl dimethyl amine.

15.9 parts of epoxidized soybean oil having the properties described in Example I was mixed with 14.1 parts of a mixture of anhydrides made up of 40% chlorendic anhydride, 40% chlorophthalic anhydride and 20% hexahydrophthalic anhydride. .3 part of benzyl dimethylamine was added thereto. This mixture was heated for 2 hours at 125° C. The resulting product was a hard strong casting which could be bounced on the floor without breaking.

*Example VIII*

Example VI was repeated with the exception that the mixture of anhydrides was made up as shown in the following table:

| Anhydride | Experiment Number | | | | | |
| --- | --- | --- | --- | --- | --- | --- |
|  | 1 | 2 | 3 | 4 | 5 | 6 |
| Hexahydrophthalic Anhydride | 33.3 | 50 | 25 | 25 | 20 | 40 |
| Chlorendic Anhydride | 33.3 | 25 | 50 | 25 | 40 | 20 |
| Chlorophthalic Anhydride | 33.3 | 25 | 25 | 50 | 40 | 40 |

In each case, the resulting product was a hard solid casting.

*Example IX*

This example illustrates the cure of epoxidized soybean oil with a mixture of pyromellitic anhydride and chlorendic anhydride in the presence of benzyldimethylamine.

100 parts of an epoxidized soybean oil having an epoxy value of 0.40 eq./100 g. was heated to 65° C. and a mixture of 10.9 parts of pyromellitic anhydride, 111 parts of chlorendic anhydride and 2 parts of benzyldimethylamine added thereto with stirring. The mixture was placed in an oven at about 115° C. The resulting product was a hard flexible casting.

*Example X*

This example illustrates the cure of an epoxidized polyester of ethylene glycol and 8-12-eicosadienedioic acid with a mixture of chlorendic anhydride, chlorophthalic anhydride and hexahydrophthalic anhydride in the presence of benzyldimethyl amine.

100 parts of an epoxidized polyester of ethylene glycol and 8,12-eicosadienedioic acid having an epoxy value of .237 eq./100 g. was heated with 52 parts of a mixture of anhydrides made up of 40% chlorendic anhydride, 40% chlorophthalic anhydride and 20% hexahydrophthalic anhydride. 1 part of benzyldimethylamine was then added. This mixture was heated for 4 hours at 100° C. The resulting product was a hard strong casting which could be bounced on the floor without breaking.

*Example XI*

This example illustrates the cure of an epoxidized polyester of propylene glycol and tetrahydrophthalic anhydride with hexahydrophthalic anhydride in the presence of methyldiethanolamine.

100 parts of an epoxidized polyester of ethylene glycol and tetrahydrophthalic acid having an epoxy value of 0.178 eq./100 g. was heated with 50 parts of hexahydrophthalic anhydride and 1 part of methyldiethanolamine at 125° C. for four hours. The resulting casting had a Barcol hardness of 35.

*Example XII*

This example illustrates the cure of an epoxidized dicrotyl adipate (B.P. 170–174° C.) with hexahydrophthalic anhydride in the presence of benzyldimethylamine.

100 parts of epoxidized dicrotyl adipate was combined with 60 parts of hexahydrophthalic anhydride and 2 parts of benzyldimethylamine and the mixture heated to 100° C. for four hours. The resulting casting was a hard flexible solid.

Related results are obtained by replacing the epoxidized dicrotyl adipate in the above process with equal amounts of epoxidized dicrotyl terephthalate, epoxidized dicrotyl phthalate, epoxidized dicrotyl isophthalate.

*Example XIII*

This example illustrates the cure of epoxidized dicrotyl oxalate (M.P. 102–106° C.) with chlorendic anhydride in the presence of triethylamine.

100 parts of epoxidized dicrotyl oxalate was combined with 64 parts of chlorendic anhydride and 2 parts of triethylamine and the mixture heated to 100° C. for four hours. The resulting casting was a hard flexible solid.

*Example XIV*

This example illustrates the cure of epoxidized dimethyl 8,12-eicosadienedioate with chlorendic anhydride and tributyl amine.

100 parts of epoxidized dimethyl 8,12-eicosadienedioate was combined with 64 parts of chlorendic anhydride and 2 parts of tributyl amine. This mixture was then heated to 100° C. for 4 hours. The resulting product was a hard tough solid casting.

Related results are obtained by replacing the epoxidized dimethyl 8,12-eicosadienedioate in the above process with equal amounts of each of the following: epoxidized dimethyl ester of octadienedioic acid, the dibutyl ester of 4-methyl-1,4-cyclohexadiene-1,2-dicarboxylic acid and the dihexyl ester of octadecadienedioic acid.

*Example XV*

This example illustrates the cure of epoxidized tetrahydrobenzyl tetrahydrobenzoate with hexahydrophthalic anhydride and dimethylethanol amine.

100 parts of epoxidized tetrahydrobenzyl tetrahydrobenzoate having an epoxy value of .73 eq./100 g. was combined with 120 parts of hexahydrophthalic anhydride and 1 part of dimethylethanol amine and the mixture heated at 125° C. for 4 hours. The resulting product was a casting with a Barcol hardness of 45.

Related results are obtained by replacing the epoxidized tetrahydrobenzyl tetrahydrobenzoate in the above process with equal amounts of epoxidized ditetrahydrobenzyl phthalate.

*Example XVI*

This example illustrates the cure of epoxidized dicyclohexenyl propane with chlorendic anhydride and benzyldimethyl amine.

100 parts of epoxidized dicyclohexenyl propane is combined with 50 parts of chlorendic anhydride and 2 parts of benzyldimethyl amine and the mixture heated at 125° C. for 5 hours. The resulting product is a hard flexible casting.

*Example XVII*

This example illustrates the unexpected superior results obtained by treating epoxidized cyclohexenyl cyclohexenecarboxylate with an acid anhydride in the presence of an amine.

About 100 parts of epoxidized cyclohexenyl cyclohexenecarboxylate was combined with 50 parts of hexahydrophthalic anhydride in the presence of 2 parts of p,p'-bis (dimethylaminophenyl) methane. In a short period, the mixture set up to form a very hard flexible casting.

*Example XVIII*

This example illustrates the cure of epoxidized Hycar rubber (butadiene-acrylonitrile copolymer) with hexahydrophthalic acid anhydride and dimethyl ethanolamine.

About 100 parts of epoxidized Hycar rubber having an epoxy value of 0.234 eq./100 g. was combined with 36 parts of hexahydrophthalic acid anhydride and 1 part of dimethyl ethanolamine and the mixture heated for four hours at 125° C. The resulting product is a hard rubbery product which could be bounced off the floor without breaking.

Related results are obtained by replacing the epoxidized Hycar rubber with an epoxidized half-hydrogenated polybutadiene having an epoxy value of 0.35 eq./100 g.

*Example XIX*

This example illustrates the cure of epoxidized dicrotyl terephthalate with hexahydrophthalic acid anhydride and dimethyl ethanolamine.

100 parts of epoxidized dicrotyl terephthalate having an epoxy value of 0.61 eq./100 g. was combined with 94 parts of hexahydrophthalic acid anhydride and 1 part of dimethyl ethanolamine and the mixture heated at 125° C. The mixture set up in about one half hour and formed a hard casting. The casting had a Barcol hardness of 32 at room temperature and a Barcol of 25 after being placed in boiling water for 3 hours.

*Example XX*

The process in the preceding example was repeated with the exception that the anhydride was chlorendic anhydride (242 parts) and the mixture was heated for 2 hours at 100° C. The product in this case was a hard solid having a Barcol hardness of 42 at room temperature.

*Example XXI*

This example illustrates the cure of epoxidized dicrotyl phthalate with hexahydrophthalic acid anhydride and dimethyl ethanolamine.

100 parts of epoxidized dicrotyl phthalate having an epoxy value of 0.60 eq./100 g. was combined with 92 parts of hexahydrophthalic acid anhydride and 1 part of dimethyl ethanolamine and the mixture heated at 125° C. In 1 hour, the mixture set up to form a hard casting having a Barcol hardness of 36 at room temperature.

*Example XXII*

The process in the preceding example was repeated with the exception that the anhydride was chlorendic anhydride (242 parts) and the mixture was heated for 2 hours at 100° C. The product in this case was a hard solid having a Barcol hardness of 44 at room temperature.

*Example XXIII*

This example illustrates the cure of epoxidized dicrotyl isophthalate with hexahydrophthalic anhydride and dimethyl ethanolamine.

100 parts of epoxidized dicrotyl isophthalate having an epoxy value of 0.60 eq./100 g. was combined with 92 parts of hexahydrophthalic acid anhydride and 1 part of dimethyl ethanolamine and the mixture heated at 125° C. In about 1 hours and 20 minutes, the mixture set up to form a hard tough casting.

*Example XXIV*

The process in the preceding example was repeated with the exception that the anhydride was chlorendic anhydride (242 parts) and the mixture was heated for 2 hours at 100° C. The product in this case was a hard tough casting having a Barcol hardness of 46 at room temperature.

*Example XXV*

This example illustrates the cure of epoxidized dimethallyl 8,12-eicosadienedioate-1,20 with hexahydrophthalic anhydride and dimethyl ethanolamine.

100 parts of epoxidized dimethallyl 8,12-eicosadienedioate-1,20 having an epoxy value of 0.40 eq./100 g. was combined with 62 parts of hexahydrophthalic acid anhydride and 1 part of dimethyl ethanolamine and the mixture heated at 125° C. The mixture gelled in 15 minutes and formed a hard flexible casting.

I claim as my invention:

1. A process for preparing hard resinified products from materials possessing a plurality of

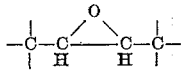

groups selected from the group consisting of epoxidized fatty oil acid triglycerides, epoxidized esters of ethylenically unsaturated monohydric alcohols and ethylenically unsaturated monocarboxylic acids, epoxidized esters of ethylenically unsaturated monohydric alcohols and polycarboxylic acids, epoxidized esters of polyhydric alcohols and ethylenically unsaturated polycarboxylic acids, epoxidized polymers of diolefins and epoxidized bis(cyclohexenyl)propane, which comprises heating at a temperature between 50° C. and 200° C. the said material having the internal epoxy groups with at least .8 equivalents of a polycarboxylic acid anhydride in the presence of a small amount up to 10% by weight of a member of the group consisting of tertiary amines, their salts and quaternary ammonium salts, the expression "equivalent" as used refers to that amount needed to furnish one carboxylic acid anhydride group per

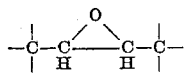

group.

2. A hard acetone-insoluble infusible product obtained by the process of claim 1.

3. A process for preparing hard resinified products from materials possesing a plurality of

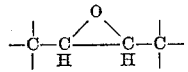

groups selected from the group consisting of epoxidized fatty oil acid triglycerides, epoxidized esters of ethylenically unsaturated monohydric alcohols and ethylenically unsaturated monocarboxylic acids, epoxidized esters of ethylenically unsaturated monohydric alcohols and polycarboxylic acids, epoxidized esters of polyhydric alcohols and ethylenically unsaturated polycarboxylic acids, epoxidized polymers of diolefins and epoxidized bis(cyclohexenyl)propane, which comprises heating the said material possessing internal epoxy groups at a temperature between 50° C. and 200° C. with at least .8 equivalents of a polycarboxylic acid anhydride in the presence of 0.1% to 10% by weight of the resin of a tertiary amine, the expression "equivalent" as used herein refers to that amount needed to furnish one carboxylic acid anhydride group per

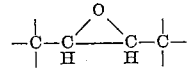

group.

4. A process as in claim 3 wherein the epoxidized material is an epoxidized fatty oil acid triglyceride.

5. A process as in claim 3 wherein the epoxidized material is an epoxidized ester of a polyethylenically unsaturated polycarboxylic acid.

6. A process as in claim 3 wherein the epoxidized material is an epoxidized butadiene polymer.

7. A process as in claim 3 wherein the epoxidized material is an epoxidized dicrotyl ester of an aromatic dicarboxylic acid.

8. A process as in claim 3 wherein the anhydride is a chlorinated polycarboxylic acid anhydride.

9. A process as in claim 3 wherein the amine is a tertiary alkyl amine containing no more than 12 carbon atoms.

10. A process as in claim 3 wherein the anhydride is chlorendic anhydride.

11. A process as in claim 3 wherein the anhydride is chloromaleic anhydride.

12. A process for producing a hard resinified product which comprises heating at a temperature between 50° C. and 200° C. an epoxidized ester of an unsaturated monohydric alcohol and an unsaturated monocarboxylic acid which ester contains a plurality of

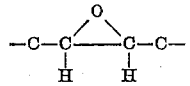

groups, and said epoxidized esters having no other groups more reactive with carboxylic acid anhydride groups than the said

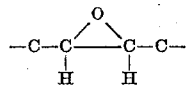

groups with at least .8 equivalent of a polycarboxylic acid anhydride and from 0.1% to 10% by weight of the resin of a tertiary monoamine, the expression "equivalent" as used herein refers to that amount needed to furnish one carboxylic acid anhydride group per

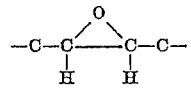

group.

13. A process for producing a hard resinified product which comprises heating at a temperature between 50° C. and 100° C. an epoxidized fatty oil acid triglyceride which contains a plurality of

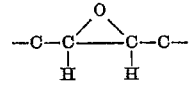

groups and has no other groups more reactive with carboxylic acid anhydride groups than the said

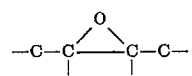

groups with at least .8 equivalent of a polycarboxylic acid anhydride and from 0.1% to 10% by weight of the resin of a tertiary monoamine, the expression "equivalent" as used herein refers to that amount needed to furnish one carboxylic acid anhydride group per

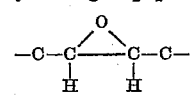

group.

14. A process for producing a hard resinified product which comprises heating at a temperature between 50° C. and 100° C. epoxidized soybean oil with at least .8 equivalents of a polycarboxylic acid anhydride in the presence of from 0.1% to 10% by weight of the resin of a tertiary monoamine, the expression "equivalent" as used herein refers to that amount needed to furnish one carboxylic acid anhydride group per

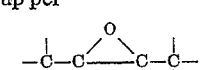

group.

References Cited in the file of this patent

UNITED STATES PATENTS

| | | |
|---|---|---|
| 2,476,922 | Shokal et al. | July 19, 1949 |
| 2,660,563 | Banes et al. | Nov. 24, 1953 |
| 2,680,109 | Stevens et al. | June 1, 1954 |

(Other references on following page)

UNITED STATES PATENTS

| | | |
|---|---|---|
| 2,682,515 | Naps | June 29, 1954 |
| 2,732,367 | Shokal | Jan. 24, 1956 |
| 2,761,870 | Payne et al. | Sept. 4, 1956 |
| 2,768,153 | Shokal | Oct. 23, 1956 |
| 2,786,067 | Frostick et al. | Mar. 19, 1957 |
| 2,826,566 | Greenspan et al. | Mar. 11, 1958 |
| 2,829,984 | Yaeger | Apr. 8, 1958 |
| 2,839,495 | Carey | June 17, 1958 |

FOREIGN PATENTS

| | | |
|---|---|---|
| 518,057 | Great Britain | Feb. 15, 1940 |
| 133,819 | Australia | July 10, 1946 |
| 511,733 | Belgium | Nov. 29, 1952 |

OTHER REFERENCES

Dearborn et al.: Journal of Polymer Science, vol. XVI, pages 201–208 (April 1955).